Nov. 2, 1965  E. J. BONITT  3,215,323
CAR TRUNK LID CARRIER

Filed May 8, 1964  2 Sheets-Sheet 1

INVENTOR.
EDWARD J. BONITT,
BY
McMorrow, Berman & Davidson
ATTORNEYS,

Nov. 2, 1965  E. J. BONITT  3,215,323
CAR TRUNK LID CARRIER
Filed May 8, 1964  2 Sheets-Sheet 2
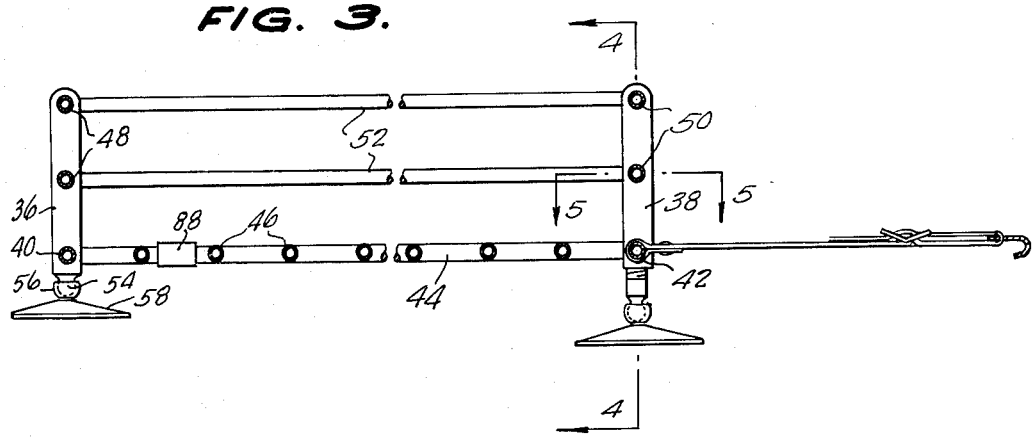
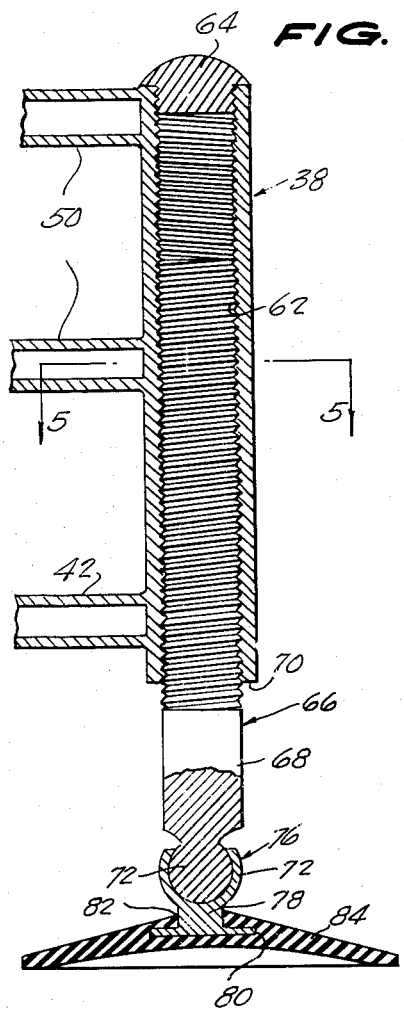
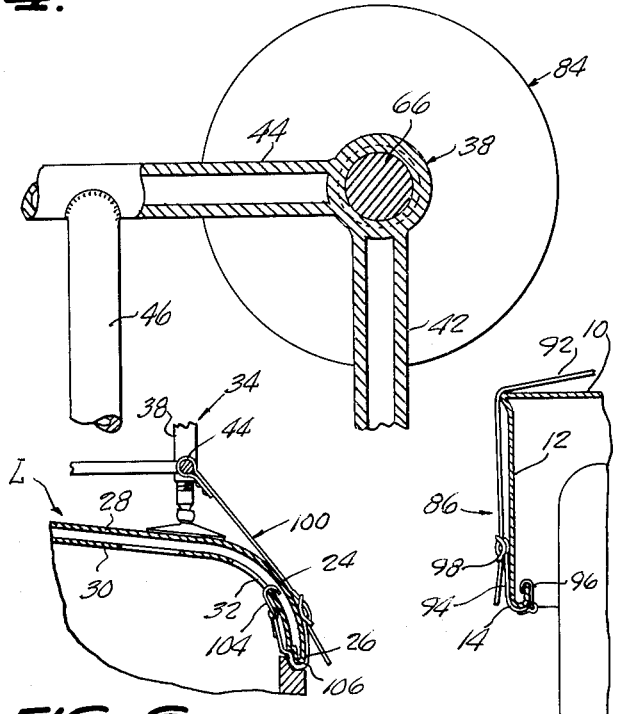
INVENTOR.
EDWARD J. BONITT,
BY
McMorrow, Berman & Davidson
ATTORNEYS.

United States Patent Office 3,215,323
Patented Nov. 2, 1965

3,215,323
CAR TRUNK LID CARRIER
Edward J. Bonitt, 1935 Laurel, Joplin, Mo.
Filed May 8, 1964, Ser. No. 365,949
1 Claim. (Cl. 224—29)

This invention relates to luggage carriers for cars, and more particularly to such a carrier for the lids of the trunk compartments thereof.

The primary object of the invention is the provision of a carrier of the kind indicated which is easily applied to and removed from a trunk compartment lid, which provides load-carrying capacity substantially equal to the tops of such lids, provides ease of loading and unloading, minimizes wind resistance, and is removable for storage in the trunk compartment.

Another object of the invention is the provision of a carrier of the character indicated above which has rear straps adapted to be removably secured to the underside of a lid, and side straps which are adapted to be hooked under the rear fenders of a car, the side straps being readily releasable to enable swinging the lid up to an open position, without otherwise disturbing the carrier.

A further object of the invention is the provision, in a device of the character indicated above, of vertically adjustable lid-engaging supports, which are adapted to be readily adjusted for levelling the carrier on lids of different shapes and contours.

In the drawings:

FIGURE 3 is an enlarged and contracted side elevation of FIGURE 2;

FIGURE 4 is a further enlarged and fragmentary vertical transverse section taken on the line 4—4 of FIGURE 3;

FIGURE 5 is a fragmentary horizontal section, on the scale of FIGURE 4, taken on the line 5—5 of FIGURE 3;

FIGURE 6 is a fragmentary vertical longitudinal section taken on the line 6—6 of FIGURE 1; and FIGURE 7 is a fragmentary vertical transverse section taken on the line 7—7 of FIGURE 1.

Figure 1:
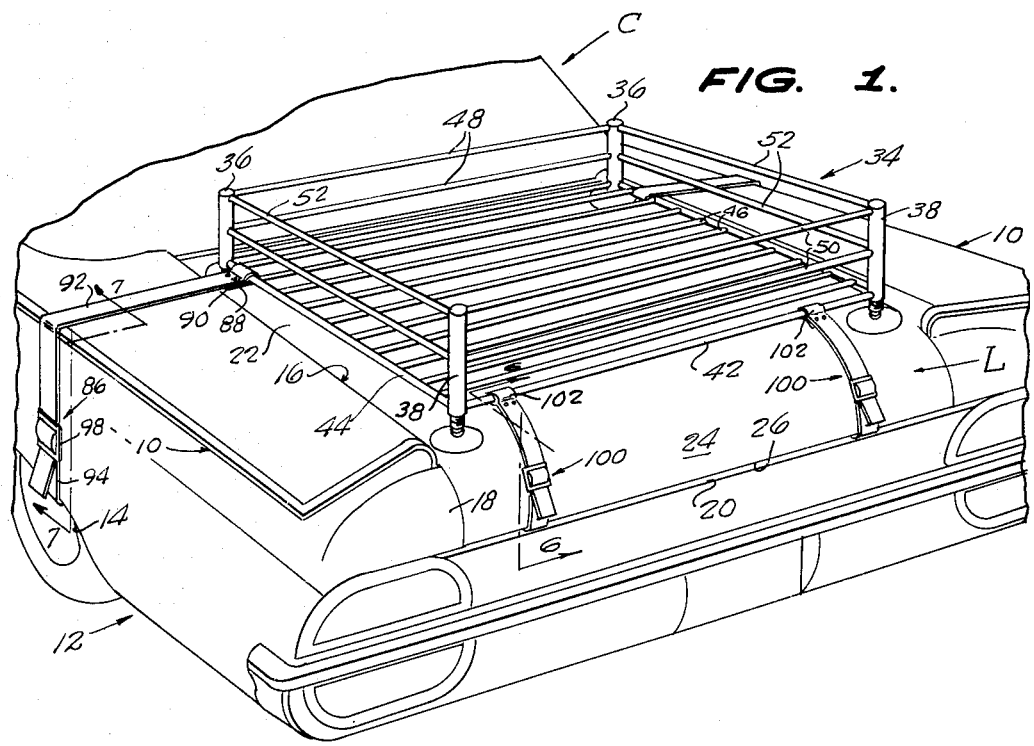
FIGURE 1 is a fragmentary rear perspective view of a car showing a carrier of the present invention installed on the trunk compartment lid thereof.

Referring in detail to the drawings, a car C is shown, which has substantially flat and substantially horizontal rear body portions 10, underlaid by fender 12, having lower edges 14. The body portions 10 define the sides of a trunk compartment 16, and have downwardly angled rear end portions 18, which extend down to the rear edge 20 of the compartment. The compartment is normally closed by a lid L, having a main substantially flat and substantially horizontal portion 22, and an abbreviated, downwardly angled rear end portion 24, terminating in a lower in a lower edge 26. As shown in FIGURE 6, the lid L is hollow and is formed of a top panel 28, and a bottom panel 30, spaced from the top panel, and formed with openings 32.

The illustrated carrier 34 is of rectangular shape, is slightly shorter than and narrower than the main portion 22. The carrier comprises a pair of vertical front corner posts 36 and a pair of rear corner posts 38. Horizontal front and rear end rods 40 and 42 extend between and are fixed to the corner posts 36 and 38, respectively, adjacent to the lower ends of these posts. Longitudinal side rods 44 extend between and are fixed to the front and rear posts, on the same level as the front and rear rods.

Parallel spaced transverse intermediate rods 46, on a level with the rods 40, 42, and 44, and spaced parallel to the front and rear rods, extend between and are fixed to the side rods 49, to form the floor or bottom wall of the carrier 34.

The front and rear walls of the carrier are formed by parallel spaced rods 48 and 50 spaced above the carrier floor, which extend between and are fixed to the front and rear corner posts, respectively.

The side walls of the carrier are formed by parallel spaced rods 52, spaced above the floor of the carrier, which extend between and are fixed to the front and rear posts.

The front posts 36 have balls 54, on their lower ends, which are removably and pivotally engaged in sockets 56, so as to form ball joints. On the lower ends of the sockets 56 are centrally secured suction cups 58 of relatively large diameter. The ball joints 60 provide for adapting the suction cups 58 to trunk lid surfaces of different contours, in levelling the carrier on the lid.

The rear corner posts 38, as shown in FIGURES 4 and 5, are tubular, and internally threaded, as indicated, at 62. Finish plugs 64 are threaded into the upper ends of the posts 38.

Adjustable legs 66, shorter than the rear posts 38, are threaded upwardly therein and have smooth lower end portions 68, which extend below the lower ends 70 of the posts 38. The lower end portions 68 terminate in bolts 72 which are pivotally and securably engaged in sockets 74, whereby ball joints 76 are formed. As shown in FIGURE 4, the sockets 74, like the sockets of the ball joints of the front corner posts 36, have short downwardly extending shanks 78 having lateral annular flanges 80, on their lower ends, which shanks and flanges are centrally embedded in the apices 82 of relatively large diameter suction cups 84. The legs 66 are adapted to be rotated, relative to the posts 38, in opposite directions, for levelling the carrier 34 on the trunk lid L, with the suction cups 84 elevated out of contact with the lid L, or while the suction cups are in contact therewith, either by hand or with the use of a suitable tool, applied to the lower end portions 68 of the legs.

Figure 2:
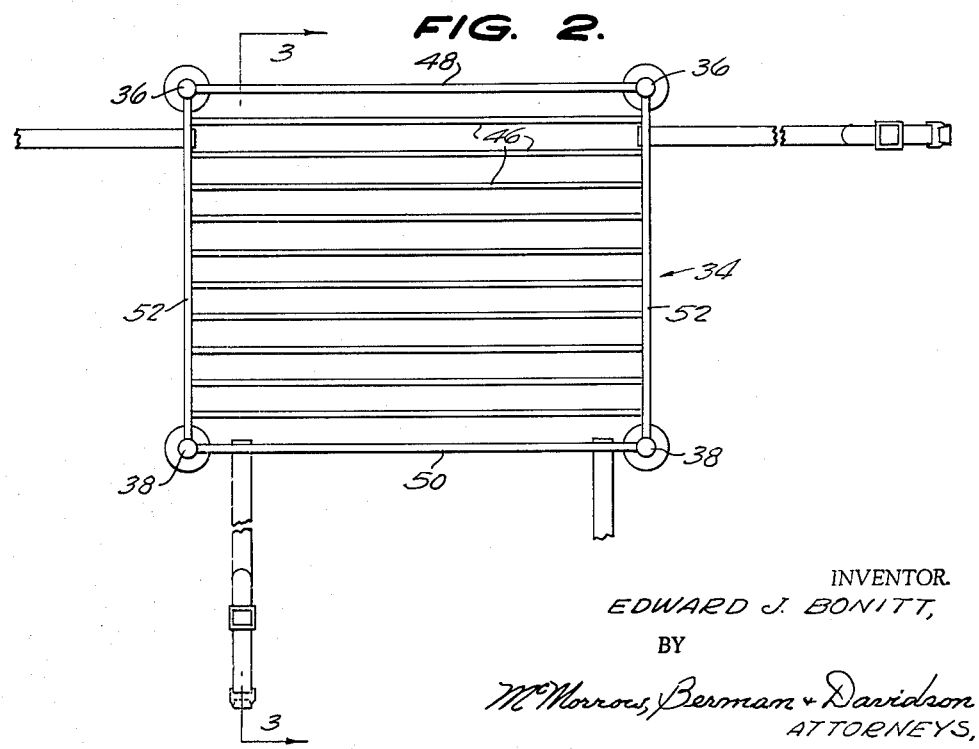
FIGURE 2 is a fragmentary top plan view of the carrier, per se.

In order to further secure the carrier 34 in place on the trunk lid L, against lateral shifting, side straps 86 are provided. The side straps 86 have loops 88, on their upper ends, which are secured, as indicated at 90, around the lower side bars 44 of the carrier, preferably, as shown in FIGURE 2, in the spaces between the forward-most intermediate rods 46 and the intermediate next behind.

The side straps 86 are composed of upper sections 92 having the loops 88 on their upper ends, and lower sections 94 which terminate, at their lower ends in hooks 96, which are removably engaged under the lower edges 14 of the rear car fenders 12, as shown in FIGURE 7. On their outer sides, the lower strap sections 94 carry friction buckles 98, through which the lower ends of the upper strap sections 92 are adjustably and securably engaged.

Forward shifting of the carrier 34, relative to the trunk lid L, is provided by at least two rear straps 100, similar to the side straps 86, which have loops 102, on their upper ends, which are secured over the lower rear rods 42 of the carrier, adjacent the ends of the latter. The rear straps 100 have hooks 104, on their lower ends, which, as shown in FIGURE 6, are engaged through openings 32 of the lower panel 30 of the lid L, with the lower sections 106 of the rear straps engaged beneath the lower edge 26 of the lid L.

With the above described structure of the carrier 34 and its mounting on the trunk lid L, loading and unloading of luggage from the carrier is substantially easier and more convenient than in the case with roof-top-mounted carriers. Further, there need not be any interference with access to the trunk compartment, since raising the trunk lid L can be done either without any adjustment of the rear straps 100, and, in most cases without adjustment of the side straps 86. When necessary, however, for free movement of the carrier 34, the side straps 86 can be readily loosened to provide the necessary freedom, and re-tightened when the lid is closed.

What is claimed is:

The combination with a car having a trunk compartment closed by an upwardly-swingable lid, said lid having a rear edge, said car having rear body portions located at opposite sides of the compartment and fenders beneath said rear body portions, said fenders having lower edges, of a carrier comprising front corner posts, rear extendable and retractable corner posts, horizontal front and rear rods extending between and fixed to the front and rear corner posts respectively adjacent the lower ends of said posts, horizontal side rods extending between and fixed to the front and rear corner posts on the same level as the front and rear rods, a plurality of transverse and parallel spaced rods disposed in a horizontal plane positioned between and on the same level of said side rods and fixed to said side rods, said horizontal front and rear rods, said side rods, and said transverse rods forming the floor of said carrier, a plurality of horizontal rods vertically-spaced from each other extending between and secured to said front corner posts, said rear corner posts, and said front and rear corner posts respectively, a swivel joint on the lower end of each of said front and rear corner posts, a suction cup carried by each of said joints, said carrier being superimposed upon said lid with the suction cups resting upon and securably-engaging the upper surface of said lid, a side strap carried by each of said side rods adjacent the front end thereof and having a hook on the free end which engages beneath the lower edge of the adjacent fender, and rear straps carried by the rear rod and having hooks on the free ends which are secured to the underside of the lid at a point forwardly relative to the rear edge of the lid.

References Cited by the Examiner

UNITED STATES PATENTS

| 2,496,085 | 1/50 | Engelheart. |
| 3,061,256 | 10/62 | Feinstein et al. |
| 3,143,264 | 8/64 | Spero. |

FOREIGN PATENTS

| 713,791 | 8/54 | Great Britain. |

GERALD M. FORLENZA, *Primary Examiner.*

HUGO O. SCHULZ, *Examiner.*